Oct. 21, 1930.  L. McKINNEY  1,778,808

METHOD OF FORMING ELECTRIC HEATER PLATES

Original Filed May 9, 1928

INVENTOR.
Lon McKinney
BY
ATTORNEYS.

Patented Oct. 21, 1930

1,778,808

UNITED STATES PATENT OFFICE

LON McKINNEY, OF ERIE, PENNSYLVANIA, ASSIGNOR TO THE GRISWOLD MANUFACTURING COMPANY, OF ERIE, PENNSYLVANIA, A CORPORATION OF PENNSYLVANIA

METHOD OF FORMING ELECTRIC HEATER PLATES

Original application filed May 9, 1928, Serial No. 276,438. Divided and this application filed December 11, 1928. Serial No. 325,158.

Electric heater plates usualy involve a metallic heating, or radiating surface, an electric element and a mounting for the electric element. The present invention is directed to the method of attaching the mounting which is ordinarily of porcelain, or insulating material, to the heating plate. The present invention is a division of application, Serial Number 276,438, filed May 9th, 1928, electric heaters and method of forming the same.

The apparatus through which the method is practiced is illustrated in the accompanying drawings as follows:—

Figure 1:
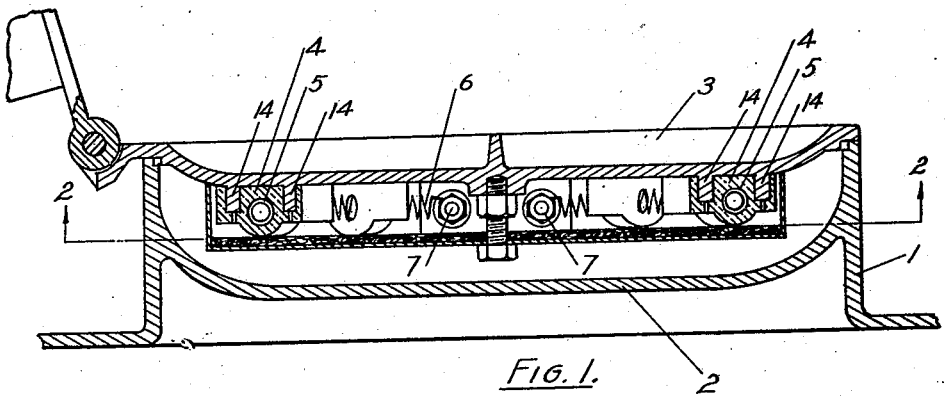

Fig. 1 shows a central section of an electric heater, this being in the specific form shown a waffle iron.

Figure 2:
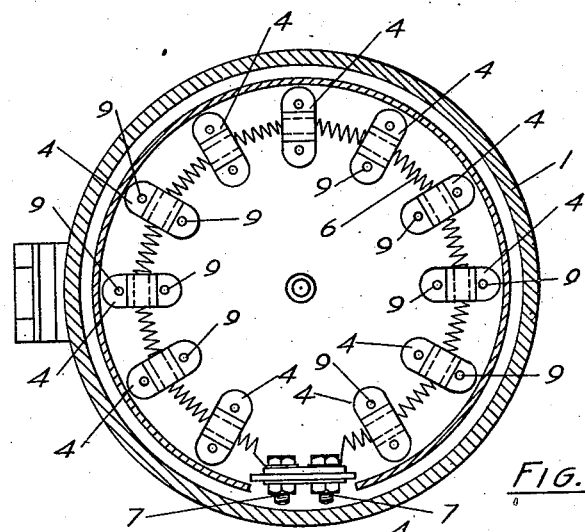

Fig. 2 a bottom view of the hot plate.

Figure 3:
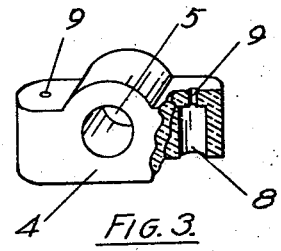

Fig. 3 an enlarged perspective view of one of the element supports.

Figure 4:
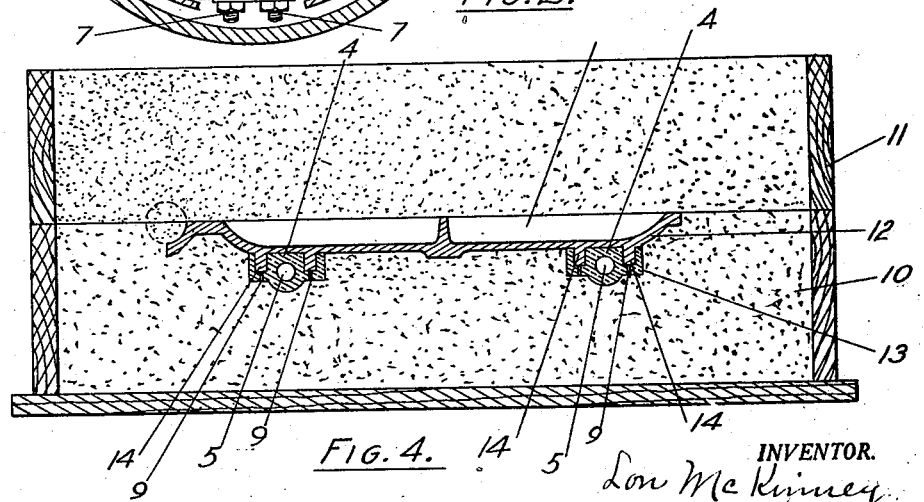

Fig. 4 a mold showing the manner of securing the supports to the hot plate.

1 marks the heater frame, 2 a closure plate formed on the frame, and 3 a hot plate mounted on the frame above the closure plate.

A series of insulating electric element supports 4 are mounted on the plate 3. These supports have openings 5 through them and are, as shown, arranged circumferentially around the plate and the heating element 6 is threaded through the openings 5, the ends being secured in the terminals 7.

Each support is provided with sockets 8 extending from one surface of the support and these sockets have vent openings 9 extending through the opposite face of the support.

In securing the supports to the plate the following method is employed: 10 represents the drag of an ordinary mold flask and 11 the cope. A mold cavity 12 is formed in the sand of the drag of the mold and cope, this mold cavity being suitable to receive the metal forming the hot plate. At the same time the pattern has prints corresponding in shape to the supports 4 and form the print cavities 13 extending from the mold cavity. The supports 4 are placed in these print cavities in the mold and the metal is then poured filling the mold as shown in Fig. 4. As the metal is poured it flows into the sockets 8 and the cooling of the metal thus secures the supports to the plate. The sockets extending in a perpendicular direction to the plate facilitate this although this is not essential for all forms of supports. The metal flowing into these cavities, or sockets, makes a nice fit with the sockets without exerting undue strain on any localized point. Consequently the insulating supports which are ordinarily porcelain and fragile will stand a great deal more pressure, or shock, than with ordinary means of securing such supports where such strains are from necessity localized on points of contact. The engaging surfaces conform exactly to the surfaces of the supports even though there may be quite a variation and thus there is an intimate contact between the supports and the plate through which there may be heat transfer from the element to the plate and this intimate relation is also true with relation to heat transfer by way of the securing plugs, or projections 14. The apparatus, therefore, is stronger than the ordinary means of support, the forming of the mold cavities takes no longer than it would without the prints for the insulating supports and the placing of the insulating supports requires less time than any ordinary operation that would secure them to the plate and there is an absence of localized contact with the insulating material so that there is less liability of breakage and greater heat transfer than with the common methods of securing such devices.

What I claim as new is:—

1. The method of forming hot plates with element supports of insulating material which consists in forming a mold having a mold cavity for the plate and prints to receive the supports, placing insulating supports having metal receiving cavities in the prints, filling the mold with molten metal for the plate and uniting the supports with the plate through the engagement of the metal as cast with said walls of said receiving cavities.

2. The method of forming hot plates with element supports of insulating material which consists in forming a mold having a mold cavity for the plate and prints to receive the supports, placing insulating supports having metal receiving cavities in the prints, filling the mold with molten metal for the plate, uniting the supports with the plate through the engagement of the metal as cast with said walls of said receiving cavities, and forming a cast surface on the plate conforming to the surfaces of the supports.

In testimony whereof I have hereunto set my hand.

LON McKINNEY.